(12) United States Patent
Vasseur et al.

(10) Patent No.: US 8,874,788 B2
(45) Date of Patent: Oct. 28, 2014

(54) PUSH-BASED SHORT-CUT REQUESTS WITHIN A DIRECTED ACYCLIC GRAPH

(71) Applicant: Cisco Technology, Inc., San Jose, CA (US)

(72) Inventors: Jean-Philippe Vasseur, Saint Martin d'Uriage (FR); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 13/668,744

(22) Filed: Nov. 5, 2012

(65) Prior Publication Data

US 2014/0129734 A1    May 8, 2014

(51) Int. Cl.
   *G06F 15/173*   (2006.01)

(52) U.S. Cl.
   USPC .......................................... 709/241; 709/235

(58) Field of Classification Search
   USPC ........... 709/238–244; 370/229, 232, 255, 256
   See application file for complete search history.

(56) References Cited

U.S. PATENT DOCUMENTS

| | | | | |
|---|---|---|---|---|
| 7,068,660 B2 * | 6/2006 | Suni | | 370/395.2 |
| 7,088,677 B1 * | 8/2006 | Burst, Jr. | | 370/229 |
| 7,145,871 B2 * | 12/2006 | Levy et al. | | 370/229 |
| 7,408,881 B2 * | 8/2008 | Acharya et al. | | 370/238 |
| 7,496,078 B2 * | 2/2009 | Rahman | | 370/338 |
| 7,567,822 B2 * | 7/2009 | Hart et al. | | 455/562.1 |
| 7,568,045 B1 | 7/2009 | Agrawal | | |
| 7,602,726 B1 | 10/2009 | Sundaresan et al. | | |
| 7,675,860 B2 * | 3/2010 | Vasseur et al. | | 370/237 |
| 7,701,852 B1 * | 4/2010 | Hohn et al. | | 370/232 |
| 7,706,345 B2 * | 4/2010 | Meier et al. | | 370/338 |
| 7,720,010 B2 * | 5/2010 | Ribiere et al. | | 370/256 |
| 7,820,025 B2 * | 10/2010 | Ciampi et al. | | 205/80 |
| 7,835,293 B2 | 11/2010 | Cidon et al. | | |
| 7,839,864 B1 | 11/2010 | Satrawla et al. | | |
| 7,860,025 B2 * | 12/2010 | Thubert et al. | | 370/254 |
| 7,899,027 B2 * | 3/2011 | Castagnoli et al. | | 370/350 |
| 7,903,573 B2 * | 3/2011 | Singer et al. | | 370/252 |
| 7,984,137 B2 * | 7/2011 | O'Toole et al. | | 709/224 |
| 8,077,607 B2 | 12/2011 | Raszuk et al. | | |
| 8,270,313 B2 * | 9/2012 | Tao et al. | | 370/252 |
| 8,305,896 B2 | 11/2012 | Wood et al. | | |

(Continued)

OTHER PUBLICATIONS

Goyal, et al., "Reactive Discovery of Point-to-Point Routes in Low Power and Lossy Networks", draft-ietf-roll-p2p-rpt-14, Oct. 2012, 36 pages, Internet Engineering Task Force Trust.

(Continued)

*Primary Examiner* — Sargon Nano
(74) *Attorney, Agent, or Firm* — Edwards Wildman Palmer LLP; James M. Behmke; Kenneth J. Heywood (57) ABSTRACT

In one embodiment, a root of a directed acyclic graph (DAG) may determine transmission of critical traffic from a first device to a second device in a computer network using the DAG, and may also determine a maximum tolerable delay of the critical traffic. As such, the root may compute, based on a known topology of the computer network, a constrained shortest path first (CSPF) point-to-point (P2P) path from the first device to the second device to meet the maximum tolerable delay. The root may then inform the first device of the P2P path to the second device to cause the first device to use the P2P path for the critical traffic.

22 Claims, 9 Drawing Sheets

(56) References Cited

U.S. PATENT DOCUMENTS

| | | | |
|---|---|---|---|
| 8,588,082 B2* | 11/2013 | Gintis et al. | 370/244 |
| 8,595,359 B2* | 11/2013 | Shaffer et al. | 709/225 |
| 2006/0146733 A1* | 7/2006 | Alicherry et al. | 370/255 |
| 2009/0190482 A1 | 7/2009 | Blair | |
| 2011/0228788 A1* | 9/2011 | Thubert et al. | 370/400 |
| 2012/0099538 A1 | 4/2012 | Venkataswami et al. | |
| 2012/0106507 A1 | 5/2012 | Venkataswami et al. | |
| 2012/0155511 A1* | 6/2012 | Shaffer et al. | 375/133 |
| 2012/0233326 A1* | 9/2012 | Shaffer et al. | 709/225 |
| 2013/0010798 A1 | 1/2013 | Shaffer et al. | |
| 2013/0019005 A1 | 1/2013 | Hui et al. | |

OTHER PUBLICATIONS

Lampreia, et al., "Notification of Transmittal of the International Search Report and the Written Opinion of the International Searching Authority, or the Declaration", Patent Cooperation Treaty, International Application No. PCT/US2013/067446, mailed Jan. 29, 2014, 12 pages, European Patent Office, Rijswijk, Netherlands.

Gnawali, et al., "The Minimum Rank with Hysteresis Objective Function", Request for Comments 6719, Sep. 2012, 13 pages, Internet Engineering Task Force Trust.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Request for Comments 6550, Mar. 2012, 157 pages, Internet Engineering Task Force Trust.

* cited by examiner

PUSH-BASED SHORT-CUT REQUESTS WITHIN A DIRECTED ACYCLIC GRAPH

TECHNICAL FIELD

The present disclosure relates generally to computer networks, and, more particularly, to routing within directed acyclic graphs (DAGs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

RPL supports two modes of operation for maintaining and using Downward routes:

1) Storing Mode: where routers unicast control messages directly to their DAG parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast control messages directly to the DAG Root. The control messages also include the IPv6 addresses for the source's DAG Parents. By receiving control messages from each RPL router in the network, the DAG Root obtains information about the DAG topology and can use source routing to deliver datagrams. Unlike Storing mode, intermediate RPL routers in Non-Storing mode do not maintain any Downward routes.

In most networks deployed today, the mode of operation of choice is non-storing for a number of reasons, such as the absence of routing states on intermediates nodes in the network. Originally, deployments started with delay-tolerant communication and centralized collection or sourcing of data, such as meter networks. However, other network configurations, such as Distributed Automation which requires gateways in the mesh, lead to a new set of requirements and traffic matrices. For instance, not only do nodes need to communicate with each other, but paths in the mesh are required to support bounded delays (e.g., 40 ms).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a root of a directed acyclic graph (DAG) may determine transmission of critical traffic from a first device to a second device in a computer network using the DAG, and may also determine a maximum tolerable delay of the critical traffic. As such, the root may compute, based on a known topology of the computer network, a constrained shortest path first (CSPF) point-to-point (P2P) path from the first device to the second device to meet the maximum tolerable delay. The root may then inform the first device of the P2P path to the second device to cause the first device to use the P2P path for the critical traffic.

According to one or more additional embodiments of the disclosure, the first device may determine transmission of critical traffic from the first device to a second device in a computer network, where the critical traffic is associated with a maximum tolerable delay. As such, the first device sends a request (which may either be implicit or explicit) to a root of a DAG to compute a CSPF P2P path from the first device to the second device to meet the maximum tolerable delay. Upon receiving the P2P path to the second device, the first device may then begin using the P2P path for the critical traffic.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
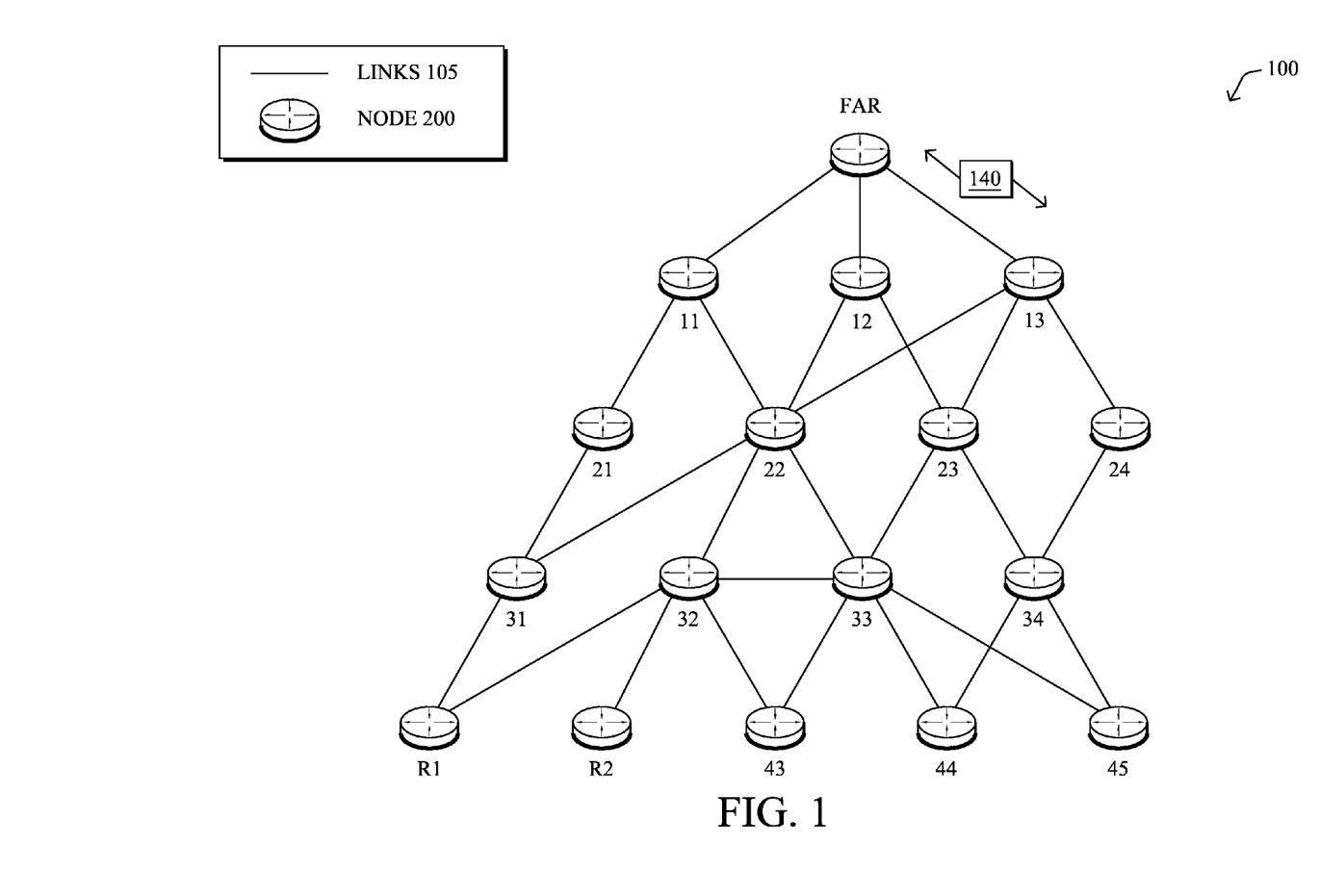
FIG. 1 illustrates an example communication network.

FIG. 1 is a schematic block diagram of an example computer network 100 illustratively comprising nodes/devices 200 (e.g., labeled as shown, "FAR" (field area router or root), "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
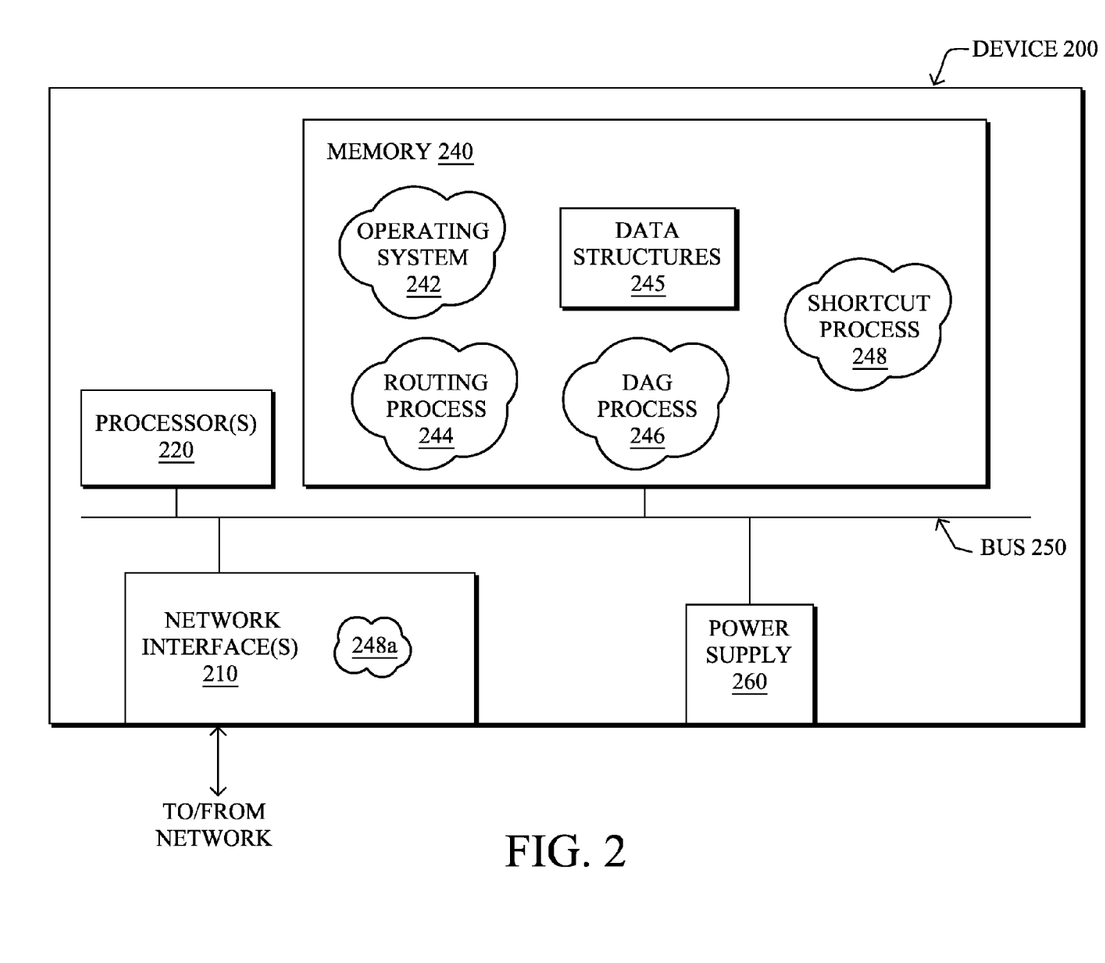
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative shortcut process 248, as described herein. Note that while shortcut process 248 is shown in centralized memory 240, alternative embodiments provide for the process to be specifically operated within the network interfaces 210 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
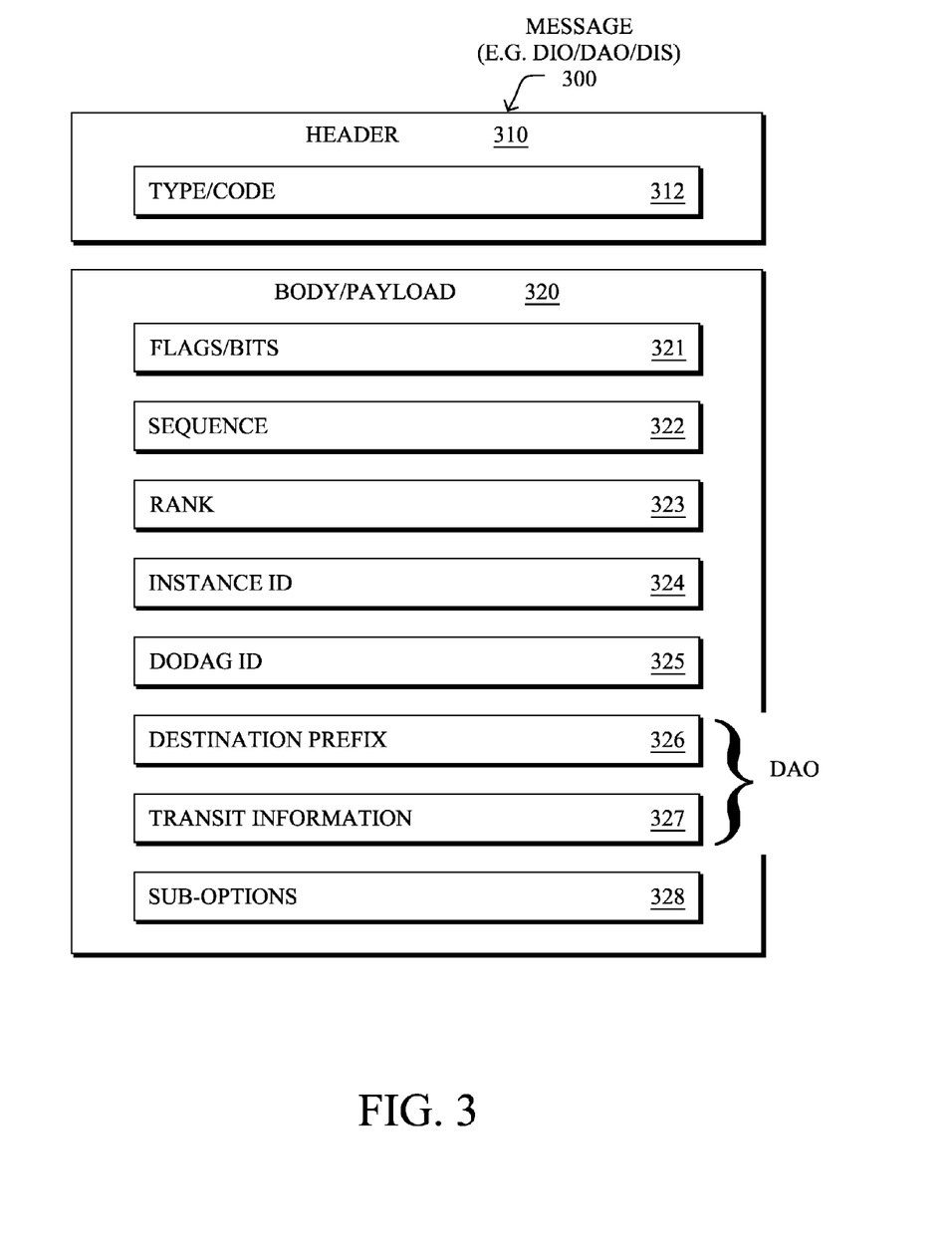
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
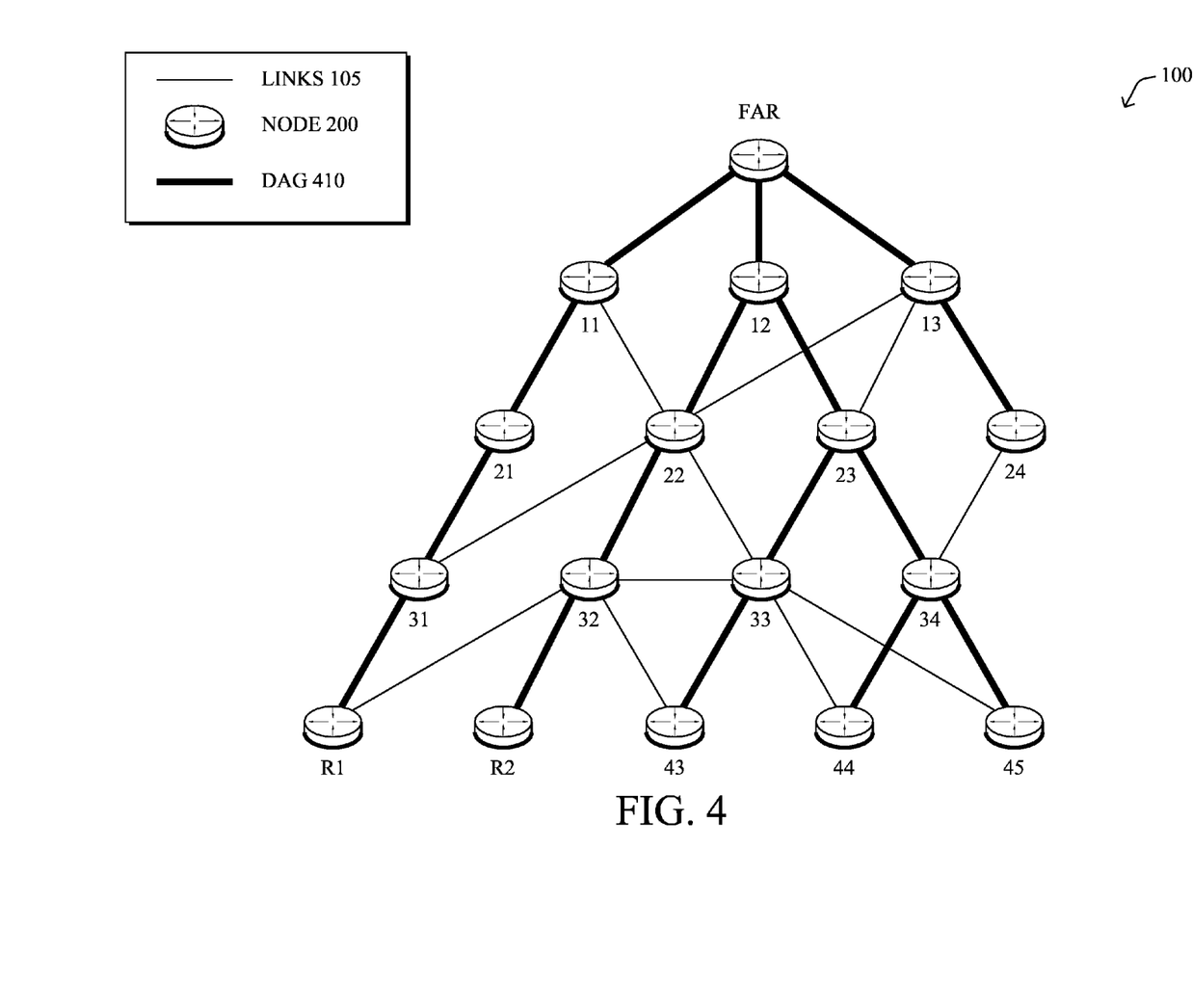
FIG. 4 illustrates an example directed acyclic graph (DAG) in the communication network in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, RPL supports two modes of operation for maintaining and using Downward routes, Storing Mode and Non-Storing Mode. In most networks deployed today, the mode of operation of choice is non-storing for a number of reasons, such as the absence of routing states on intermediates nodes in the network. However, certain networks, though desiring to benefit from non-storing mode, have instances where certain specific nodes are required to communicate with each other, and with bounded delays (e.g., 40 ms).

Notably, a point-to-point (P2P) solution was specified for RPL that uses a reactive mechanism to compute a DAG on-the-fly to find a better path than the RPL DAG protocol. Unfortunately, such an approach is problematic is a number of ways. First on-the-fly setting of a DAG is very costly and does not provide any control on the degree of flooding since in this case the routing protocol acts as a reactive routing protocol. Furthermore, it does not allow for a central engine (e.g., the root node or otherwise) to optimally find a path between communicating nodes without the brute-force approach of reactive routing.

DAG Short-Cuts

The techniques herein provide (un-)solicited shortcut path computation that allows for different communication approaches: while non-critical or traditional point to multi-point (P2MP) or multipoint to point (MP2P) traffic may follow the DAG computed by a distributed algorithm, the techniques herein specify an approach where nodes requiring shortcuts to destinations for critical traffic send packets (e.g., actual data or signaling messages) to the destination that triggers the computation of such a shortcut by the DAG root. If the DAG does not have sufficient information, it may select a set of nodes for which more detailed neighborhood information is required, which provide addition local connectivity, e.g., by generating a new (jittered) DAO. The set of shortcuts are then used in the network between nodes generating critical traffic using source routing (shortcuts), thus without requiring the storage of additional states.

Specifically, according to one or more embodiments of the disclosure as described in detail below, a root of a DAG may determine transmission of critical traffic from a first device to a second device in a computer network using the DAG, and may also determine a maximum tolerable delay of the critical traffic. As such, the root may compute, based on a known topology of the computer network, a constrained shortest path first (CSPF) point-to-point (P2P) path from the first device to the second device to meet the maximum tolerable delay. The root may then inform the first device of the P2P path to the second device to cause the first device to use the P2P path for the critical traffic.

Illustratively, the techniques described herein may be performed by hardware, software, and/or firmware, such as in accordance with the "shortcut" process 248/248a, which may contain computer executable instructions executed by the processor 220 (or independent processor of interfaces 210) to perform functions relating to the techniques described herein, e.g., in conjunction with (or as a part of) routing process 244 (and/or DAG process 246). For example, the techniques herein may be treated as extensions to conventional protocols, such as the various routing protocols (e.g., RPL), and as such, may be processed by similar components understood in the art that execute those protocols, accordingly.

Operationally, the techniques herein specify a mechanism in order to push, in a solicited or unsolicited fashion, a shortcut path between a set of S arbitrary nodes that require short delays in support of critical traffic such as Distributed Protection. Note that although the techniques herein applies to all proactive routing protocols building DAGs, RPL terms are generally used herein for the sake of illustration.

A first aspect of the techniques herein consists of identifying the critical traffic, "C". To that end, end nodes transmitting the critical traffic can either use a predefined indicator (e.g., determined through configuration) such as a new flag type in the IP hop-by-hop header of the traffic. Alternatively, the root node (or LBR, field area router or "FAR", etc.) may be configured to detect the type of traffic, such as a through various fields within the traffic, deep packet inspection, source-destination pairs, etc.

Figure 5:
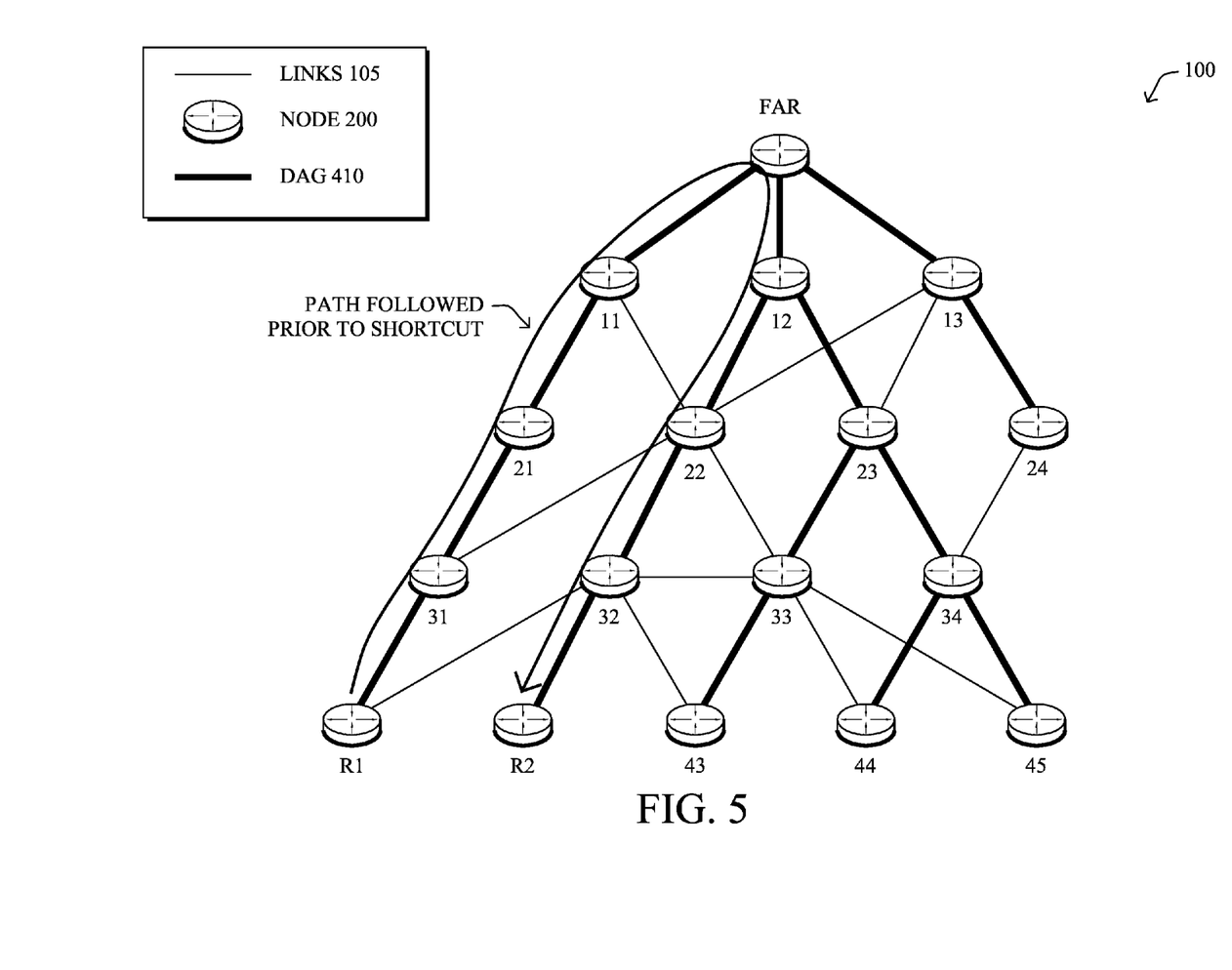
FIG. 5 illustrates an example view of traffic sent along the DAG.

FIG. 5 shows the path that traffic would follow in the DAG between the nodes R1 and R2. In the non-storing mode of operation of RPL, the path followed would have to transit through the DAG root using hop-by-hop routing before being redirected to the destination thanks to source routing. As noted above, it is likely that in certain networks, such a path (especially in deep DAGs, e.g., 20 hops away from the root) will not meet the service level agreement (SLA) requirement of the C traffic. Though the storing mode of operation may be used as described above, such an option is too costly with most of the current devices and may still fail to satisfy the delay requirements since the traffic would only be redirected upon reaching a common ancestor (notably, in FIG. 5, this is still the root node). Furthermore such a path would exhibit non deterministic path delays, which is unacceptable.

In an illustrative embodiment, a first packet of type C is sent by a node R1 to R2. Upon transiting to the DAG Root, the packet is intercepted, thus triggering the computation of the shortcut. An example algorithm triggered at the DAG root to compute a shortcut S is described as follows:

1) The DAG root first retrieves the max tolerable delay MAX_delay for the C traffic. In one embodiment, MAX_delay may either be explicitly signaled in the first packet using a newly specified TLV carried within the IPv6 hop-by-hop option and inserted by the source R1 or it may alternatively locally configured on the DAG root. In a more complex deployment scenario it is possible to specify multiple C values, each value of C (e.g., type of traffic) being associated with a corresponding MAX_delay.

2) The DAG root inspects in its network database (e.g., fed by the DAO messages received by each nodes in the network) so as to determine the shortest constrained path from R1 to R2.

2-1) If the path in use satisfies the delay requirement, no further action is required.

Figure 6:
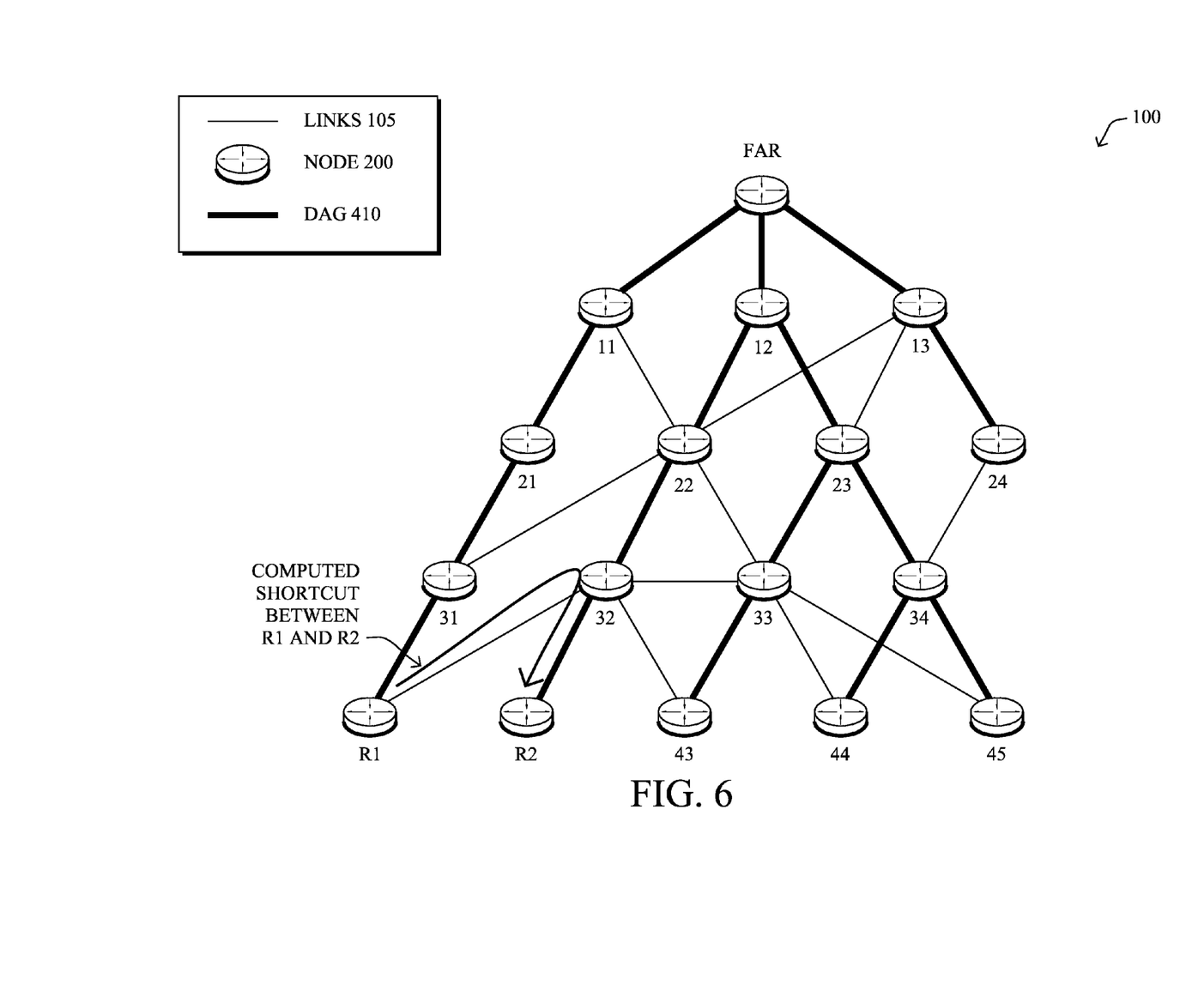
FIG. 6 illustrates an example view of traffic sent along a short-cut through the DAG.

2-2) If a path with delay <MAX_delay can be found, the shortcut SH is locally stored for a period of time T, and the requesting node R1 may be informed as described below. An example shortcut SH that may be computed is shown in FIG. 6.

2-3) If no path can be found that satisfies the delay requirement, the DAG root selects a set of nodes S for which the "maximum connectivity" is required (i.e., where all neighbors must be known by the DAG root).

The set S may be a set of nodes in the neighborhood of the requesting node and destination node (since there is usually a spatial correlation) or a larger set of nodes if not all nodes in the network. For example, nodes R1, R2, 31, 32, and 33 may be an example set S.

To that end, the DAG root may either send a unicast novel packet requiring each node in the set S to trigger the generation of a new (jittered) DAO message comprising all of its neighbors, or else in another embodiment the DAG root may perform a global repair after incrementing the DAG ID and including in its DIOs a newly specified object listing the nodes in the set S (e.g., using a Bloom Filter or other technique to compress the list of requested nodes). The requested node(s) may then trigger a local discovery (and provide the closest N neighbors should the total number of neighbor in dense environment be too large) or simply reports the neighbor database (beyond its preferred and backup parents). Alternatively the Root may require additional information from all nodes in the network.

Figure 7:
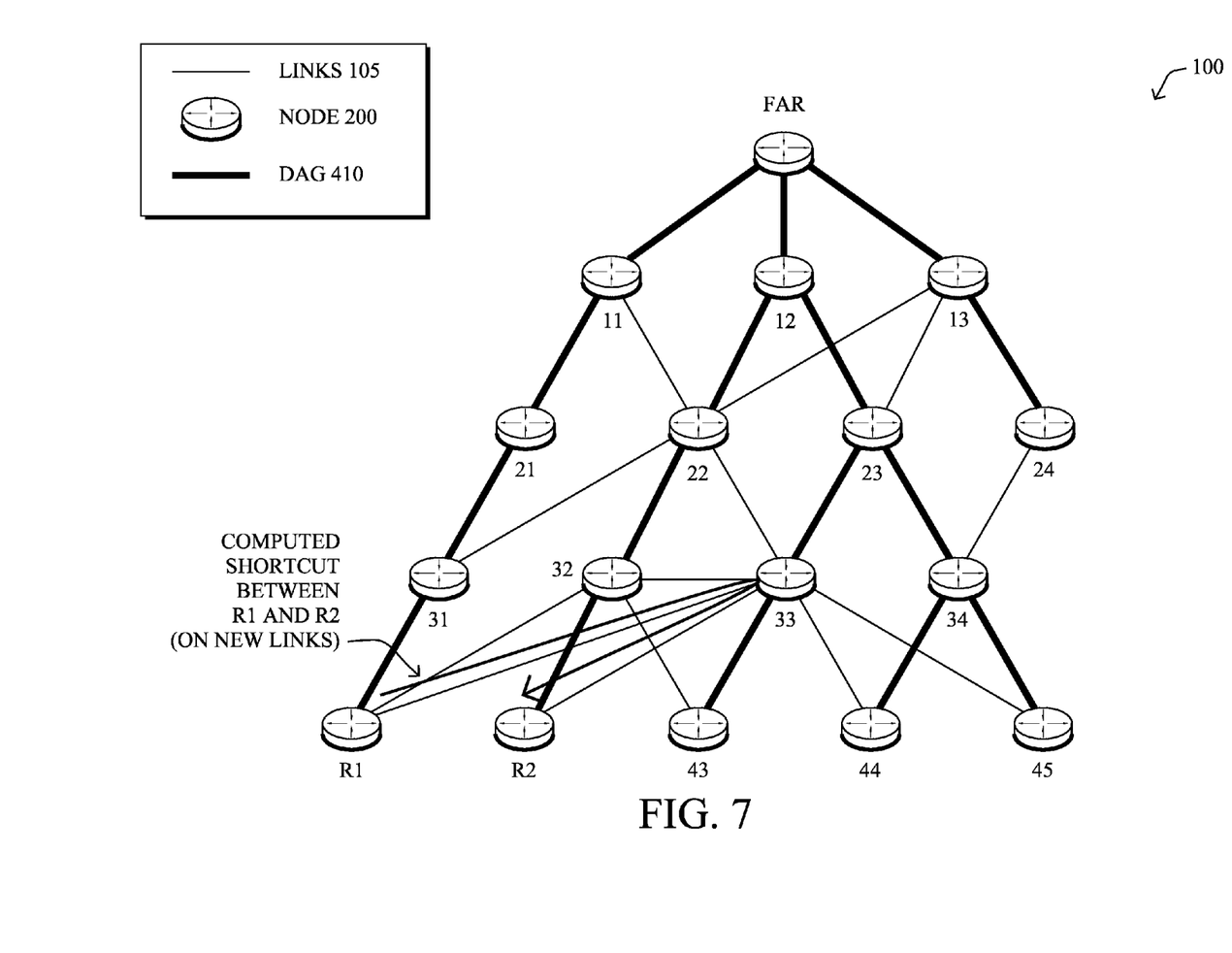
FIG. 7 illustrates an example view of traffic sent along another short-cut through the DAG with newly discovered links.

Upon receiving the new DAO messages from all nodes in the set S, the DAG Root uses a constrained shortest path first (CSPF) algorithm (e.g., the well-known Dijkstra algorithm) to compute the shortcut SH. An example expanded topology (with new links between R1 and node 33, and R2 and node 33) and corresponding shortcut SH are shown in FIG. 7. Note that if no path can still be found the DAG root may go back to step 2-2 after adding new nodes in the set S.

In yet another embodiment, the DAG root may provide more than one shortcut if N shortcuts (N>1) can be found. Receiving a set of shortcuts N (which may optionally be diverse) makes the techniques herein even more robust, avoiding the need for node R1 to send a second request should the first shortcut SH fail, or else even allowing for load balancing or protection (e.g., "1+1") techniques, as may be appreciated by those skilled in the art.

3) If a shortcut SH can be found, a new message is sent to the requesting node R1 that comprises the shortcut SH (listing all nodes or a bloom filter to encode the list of nodes in the path). Alternatively, the shortcut SH may piggybacked into the reply packet sent by the node R2 to R1 in reply to the former packet used by R1 to solicit the shortcut.

Note that the node R1 may simply start sending C traffic waiting for the DAG root to provide a shortcut at which point the node will start routing the C traffic using the shortcut SH. Alternatively the node R1 may pro-actively request a shortcut by sending a "fake" C packet, which will trigger the computation of a shortcut. Once receiving the shortcut SH, the node R1 may begin inserting the route (e.g., as a source route) into the C traffic to R2.

Note that if no shortcut can be found by the DAG root, a negative reply may be returned to R1.

Although the techniques herein have been described using two nodes R1 and R2, customers have mentioned that it may be useful to compute shortcuts between a set of nodes. In this case, in one embodiment, each node of the set will trigger the computation of shortcut according to the mechanism described above. In another embodiment, if the node R1 knows the set of nodes that must communicate using shortcuts it may encode the list L in its first packet sent to R2. In this case, the DAG root will compute all required shortcuts and provides these shortcuts to all nodes in the set L.

In yet another embodiment, the DAG root may instead off-load computation of the shortcut to an external path computation element, such as a network management server or other computation device, such as where the root itself does not have enough computational resources.

Figure 8:
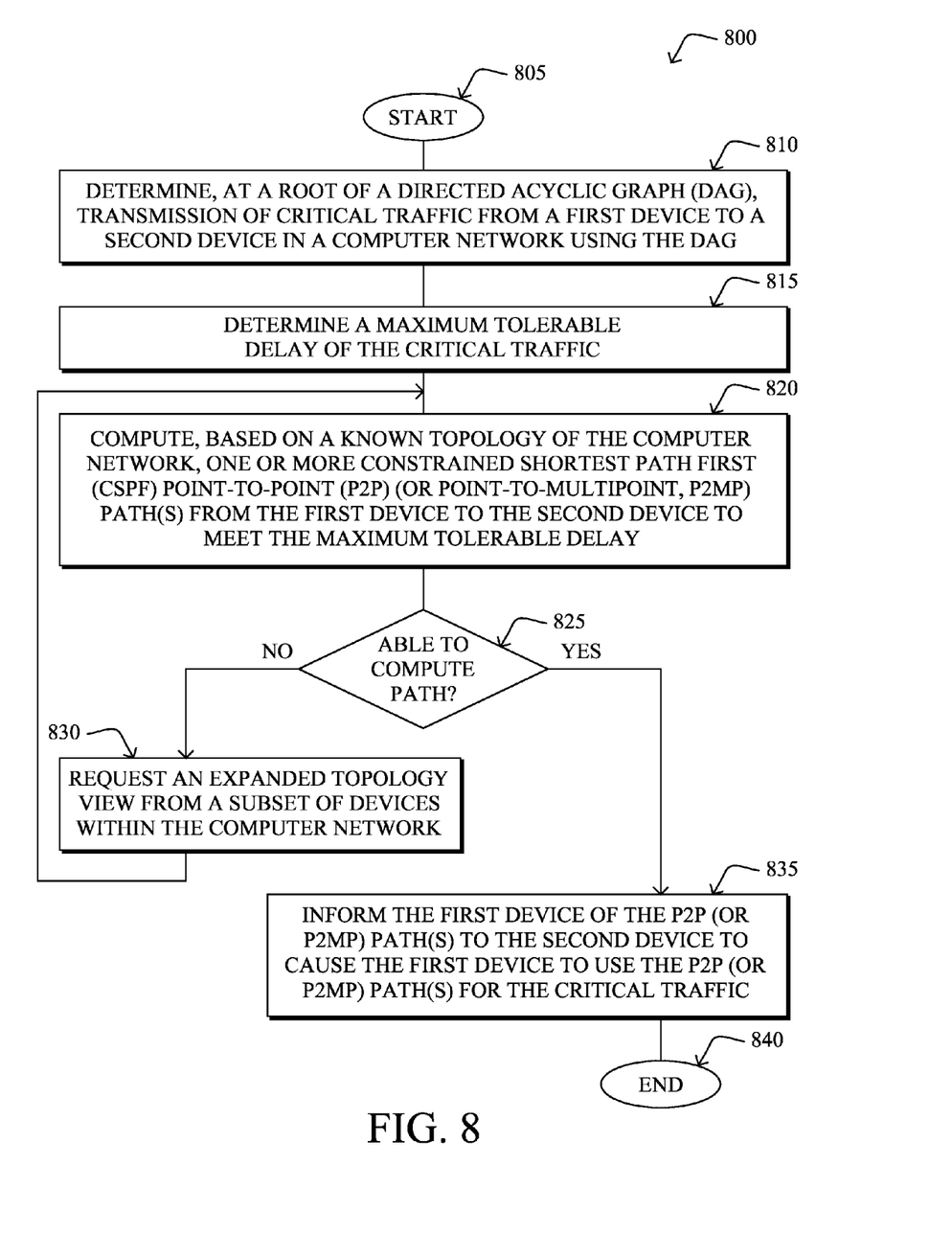
FIG. 8 illustrates an example simplified procedure for push-based short-cuts in a communication network, particularly from the perspective of a root (or other computing) node.

FIG. 8 illustrates an example simplified procedure 800 for push-based short-cuts in a communication network in accordance with one or more embodiments described herein, particularly from the perspective of a root (or other computing) node. The procedure 800 may start at step 805, and continues to step 810, where, as described in greater detail above, a root of a DAG determines transmission of critical traffic C from a first device (e.g., R1) to a second device (e.g., R2) in a computer network using the DAG. As mentioned above, the root node may have received registration regarding identification of critical traffic (e.g., between all/any nodes or else specifically from the first device to the second device), such as identifying the particular types of traffic that would be classified as "critical". In this manner, the root may identify the critical traffic while transmitted using the DAG. Alternatively, the root may detect an explicit indication within the critical traffic while transmitted using the DAG, such as particular flags, type values, etc. within the packet itself. Note that the critical traffic can be actual data/messages from the first device to the second device, or else may be an explicit signaling message (e.g., "fake" data) indicating the intent to transmit critical traffic using the computed shortcut.

Upon determining the critical traffic, in step 815 the root node may next determine a maximum tolerable delay of the critical traffic, such as by detecting an explicit notification of the maximum tolerable delay from within the critical traffic. Alternatively, the maximum tolerable delay for all critical traffic may be received at the root node during configuration (e.g., static or dynamic configuration). As still another alternative, the root node may first detect a type of the critical traffic, and may then associate the type of the critical traffic with a corresponding maximum tolerable delay.

In step 820, the root node may then compute, based on a known topology of the computer network, a CSPF point-to-point (P2P) path (shortcut) from the first device to the second device to meet the maximum tolerable delay. If in step 825 the root node determines an inability to compute a P2P path based on the known topology of the computer network to meet the maximum tolerable delay, then in step 830 the root node may request an expanded topology view from a subset of devices within the computer network. For example, as mentioned above, the root node may unicast a request to each of the subset of devices, or else may include, within a routing protocol control message (e.g., DIO), a list of the subset of devices from which the expanded topology view is requested.

Once able to compute a path, then in step 835 the root node informs the first device of the P2P path to the second device to cause the first device to use the P2P path for the critical traffic. The illustrative procedure 800 may ends in step 840. Notably, as described above, the root node may also compute a plurality of CSPF P2P paths from the first device to the second device to meet the maximum tolerable delay, and may inform the first device of the plurality of P2P paths to the second device to cause the first device to use the P2P paths for the critical traffic. Furthermore, as also mentioned above, there may be a plurality of second devices, in which case the root node may compute a plurality of P2P paths, or else may compute a point-to-multipoint (P2MP) path from the first device to the second devices to meet the maximum tolerable delay, and informs the first device accordingly.

Figure 9:
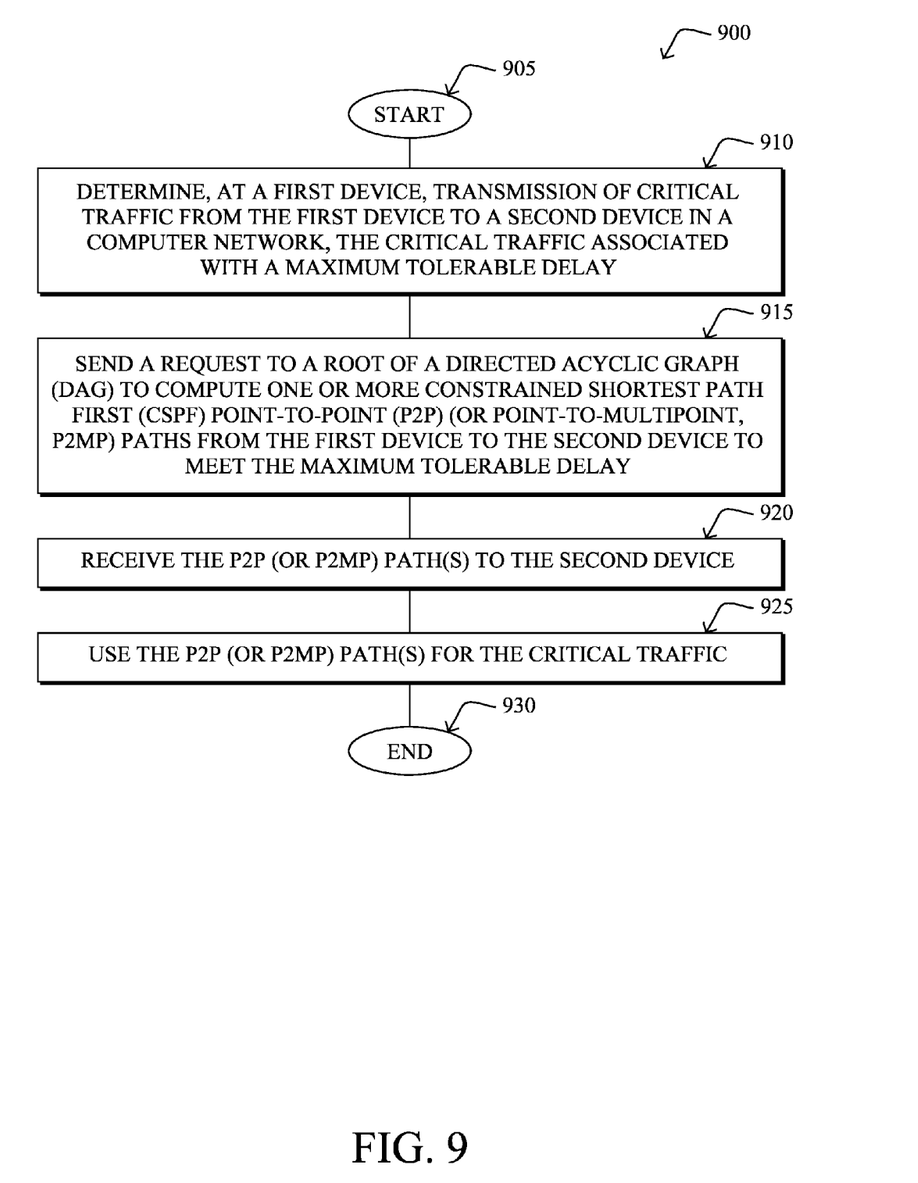
FIG. 9 illustrates another example simplified procedure for push-based short-cuts in a communication network, particularly from the perspective of a device sourcing critical traffic.

In addition, FIG. 9 illustrates another example simplified procedure 900 for push-based short-cuts in a communication network in accordance with one or more embodiments described herein, particularly from the perspective of a device sourcing critical traffic (e.g., R1). The procedure 900 may start at step 905, and continues to step 910, where, as described in greater detail above, the first device determines transmission of critical traffic from the first device to a second device in a computer network, the critical traffic associated with a maximum tolerable delay. In response, in step 915, the first device may send a request to a root of the DAG to compute one or more CSPF P2P (or P2MP) paths (shortcuts) from the first device to the second device to meet the maximum tolerable delay. Assuming there is such a path to the second device, then in step 920 the first device may receive the path(s), and may begin using them for the critical traffic to the second device (e.g., source-routing the traffic) in step 925. The simplified procedure 900 illustratively ends in step 930.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for a push-based approach to short-cuts through DAGs in a communication network. In particular, the techniques herein address a critical issue in DAG-based networks and allow nodes having delay-sensitive traffic such as distribution protection to follow paths satisfying such delay requirements in the non-storing mode of operation. The only alternative today consists of using the storing mode of operation, which is costly in terms of overhead and storage capacity on constrained devices.

While there have been shown and described illustrative embodiments that provide for a push-based approach to short-cuts through DAGs in a communication network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks (constrained or not). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, at a root of a directed acyclic graph (DAG), transmission of critical traffic from a first device to a second device in a computer network using the DAG;
    determining a maximum tolerable delay of the critical traffic;
    computing, based on a known topology of the computer network, a constrained shortest path first (CSPF) point-to-point (P2P) path from the first device to the second device to meet the maximum tolerable delay; and
    informing the first device of the P2P path to the second device to cause the first device to use the P2P path for the critical traffic.

2. The method as in claim 1, wherein determining the critical traffic comprises:
    receiving registration regarding identification of critical traffic from the first device to the second device; and
    identifying the critical traffic while transmitted using the DAG.

3. The method as in claim 1, wherein determining the critical traffic comprises:
    detecting an explicit indication within the critical traffic while transmitted using the DAG.

4. The method as in claim 1, wherein the critical traffic is one of either actual data from the first device to the second device or an explicit signaling message indicating the intent to transmit critical traffic.

5. The method as in claim 1, wherein determining the maximum tolerable delay comprises:
    detecting an explicit notification of the maximum tolerable delay from within the critical traffic.

6. The method as in claim 1, wherein determining the maximum tolerable delay comprises:
    receiving configuration of the maximum tolerable delay for all critical traffic.

7. The method as in claim 1, wherein determining the maximum tolerable delay comprises:
    detecting a type of the critical traffic, wherein the type of the critical traffic is associated with a corresponding maximum tolerable delay.

8. The method as in claim 1, further comprising:
    computing, based on a known topology of the computer network, a plurality of CSPF P2P paths from the first device to the second device to meet the maximum tolerable delay; and
    informing the first device of the plurality of P2P paths to the second device to cause the first device to use the P2P paths for the critical traffic.

9. The method as in claim 1, wherein there is a plurality of second devices, the method further comprising:
    computing, based on a known topology of the computer network, a CSPF point-to-multipoint (P2MP) path from the first device to the second devices to meet the maximum tolerable delay; and
    informing the first device of the P2MP path to the second devices to cause the first device to use the P2MP path for the critical traffic.

10. The method as in claim 1, further comprising:
    determining an inability to compute a P2P path based on the known topology of the computer network to meet the maximum tolerable delay; and, in response,
    requesting an expanded topology view from at least a subset of devices within the computer network.

11. The method as in claim 10, wherein requesting comprises:
    unicasting a request to each of the subset of devices.

12. The method as in claim 10, wherein requesting comprises:
    including within a routing protocol control message a list of the subset of devices from which the expanded topology view is requested.

13. An apparatus, comprising:
    one or more network interfaces to communicate as a root of a directed acyclic graph (DAG) within a computer network;
    a processor coupled to the network interfaces and adapted to execute one or more processes; and
    a memory configured to store a process executable by the processor, the process when executed operable to:
        determining transmission of critical traffic from a first device to a second device in a computer network using the DAG;
        determining a maximum tolerable delay of the critical traffic;
        computing, based on a known topology of the computer network, a constrained shortest path first (CSPF) point-to-point (P2P) path from the first device to the second device to meet the maximum tolerable delay; and
        informing the first device of the P2P path to the second device to cause the first device to use the P2P path for the critical traffic.

14. The apparatus as in claim 13, wherein the process when executed to determine the critical traffic is further operable to:
    detect an explicit indication within the critical traffic while transmitted using the DAG.

15. The apparatus as in claim 13, wherein the process when executed to determine the maximum tolerable delay is further operable to:
    detect an explicit notification of the maximum tolerable delay from within the critical traffic.

16. The apparatus as in claim 13, wherein the process when executed to determine the maximum tolerable delay is further operable to:
    detect a type of the critical traffic, wherein the type of the critical traffic is associated with a corresponding maximum tolerable delay.

17. The apparatus as in claim 13, wherein the process when executed is further operable to:
    compute, based on a known topology of the computer network, a plurality of CSPF P2P paths from the first device to the second device to meet the maximum tolerable delay; and
    inform the first device of the plurality of P2P paths to the second device to cause the first device to use the P2P paths for the critical traffic.

18. The apparatus as in claim 13, wherein there is a plurality of second devices, the process when executed is further operable to:
    compute, based on a known topology of the computer network, a CSPF point-to-multipoint (P2MP) path from the first device to the second devices to meet the maximum tolerable delay; and
    inform the first device of the P2MP path to the second devices to cause the first device to use the P2MP path for the critical traffic.

19. The apparatus as in claim 13, wherein the process when executed is further operable to:
- determine an inability to compute a P2P path based on the known topology of the computer network to meet the maximum tolerable delay; and, in response,
- request an expanded topology view from a subset of devices within the computer network.

20. The apparatus as in claim 19, wherein the process when executed to request is further operable to one of either unicast a request to each of the subset of devices or include within a routing protocol control message a list of the subset of devices from which the expanded topology view is requested.

21. A method, comprising:
- determining, at a first device, transmission of critical traffic from the first device to a second device in a computer network, the critical traffic associated with a maximum tolerable delay;
- sending a request to a root of a directed acyclic graph (DAG) to compute a constrained shortest path first (CSPF) point-to-point (P2P) path from the first device to the second device to meet the maximum tolerable delay;
- receiving the P2P path to the second device; and
- using the P2P path for the critical traffic.

22. An apparatus, comprising:
- one or more network interfaces to communicate within a directed acyclic graph (DAG) within a computer network;
- a processor coupled to the network interfaces and adapted to execute one or more processes; and
- a memory configured to store a process executable by the processor, the process when executed operable to:
  - determine, as a first device, transmission of critical traffic from the first device to a second device in a computer network, the critical traffic associated with a maximum tolerable delay;
  - send a request to a root of a directed acyclic graph (DAG) to compute a constrained shortest path first (CSPF) point-to-point (P2P) path from the first device to the second device to meet the maximum tolerable delay;
  - receive the P2P path to the second device; and
  - use the P2P path for the critical traffic.

\* \* \* \* \*